(12) United States Patent
Girard et al.

(10) Patent No.: US 11,599,788 B2
(45) Date of Patent: Mar. 7, 2023

(54) PARAMETER TRAINING METHOD FOR A CONVOLUTIONAL NEURAL NETWORK

(71) Applicant: Idemia Identity & Security France, Courbevoie (FR)

(72) Inventors: Fantin Girard, Courbevoie (FR); Cédric Thuillier, Courbevoie (FR); Jonathan Milgram, Courbevoie (FR)

(73) Assignee: IDEMIA IDENTITY Y & SECURITY FRANCE, Courbevoie (FR)

( * ) Notice: Subject to any disclaimer, the term of this patent is extended or adjusted under 35 U.S.C. 154(b) by 937 days.

(21) Appl. No.: 16/440,377

(22) Filed: Jun. 13, 2019

(65) Prior Publication Data
US 2019/0385056 A1  Dec. 19, 2019

(30) Foreign Application Priority Data
Jun. 13, 2018  (FR) ..................... 1855170

(51) Int. Cl.
| | |
|---|---|
| G06N 3/00 | (2023.01) |
| G06N 3/08 | (2023.01) |
| G06F 17/18 | (2006.01) |
| G06F 18/24 | (2023.01) |
| G06N 3/047 | (2023.01) |

(52) U.S. Cl.
CPC ............... *G06N 3/08* (2013.01); *G06F 17/18* (2013.01); *G06F 18/24* (2023.01); *G06N 3/047* (2023.01)

(58) Field of Classification Search
CPC ........ G06N 3/08; G06N 3/0472; G06F 17/18; G06K 9/6267; G06V 10/764; G06V 10/774; G06V 10/82; G06V 10/454; G06V 40/70
See application file for complete search history.

(56) References Cited

U.S. PATENT DOCUMENTS

2018/0268266 A1* 9/2018 Sohn .................... G06K 9/6201

OTHER PUBLICATIONS

Hauberg et al, Dreaming More Data: Class-dependent Distributions over Diffeomorphisms for Learned Data Augmentation, Proc. 19th AISTATS, vol. 41, pp. 342-350 (Year: 2016).*
Girard et al, Statistical atlas-based descriptor for an early detection of optic disc abnormalities, J. Med. Imag. 5(1), 014006, pp. 014006-1-014006-14, Mar. 6, 2018.*

(Continued)

*Primary Examiner* — Nancy Bitar
*Assistant Examiner* — Xiao Liu
(74) *Attorney, Agent, or Firm* — Womble Bond Dickinson (US) LLP

(57) ABSTRACT

A parameter training method for a convolutional neural network (CNN) for classifying image type data representative of a biometric trait. The method includes the implementation, by a data processor of a server, the steps of (a) for at least one data item from an already classified training database, generation of several alternate versions of this data each by application of at least one transformation chosen from a set of reference transformations satisfying a statistical distribution of transformations observed in the training database and (b) training the parameters of the CNN, from the already classified training database augmented with said alternate versions of the data.

14 Claims, 3 Drawing Sheets

(56) References Cited

OTHER PUBLICATIONS

Abate et al 2D and 3D face recognition a survey, Pattern Recognition Letters 28, pp. 1885-1906 (Year: 2007).*
Sarkar et al. Deep feature-based face detection on mobile devices. In 2016 IEEE International Conference on Identity, Security and Behavior Analysis (ISBA), pp. 1-8 (Year: 2016).*
International Search Report and Written Opinion of the French National Institute of Industrial Property (INPI) for FR1855170 dated Feb. 21, 2019.
Hauberg, S., Freifeld, O., Lindbo Larsen, A.B., Fisher III, J.W., Hansen, L.K., (Jun. 30, 2016), 'Dreaming More Data: Class-dependent Distributions over Diffeomorphisms for Learned Data Augmentation', in arXiv preprint arXiv:1510.02795v2 [cs.CV] 2016.
Michelsanti, D., Ene, A.-D., Guichi, Y., Stef, R., Nasrollahi, K., Moeslund, T.B., 'Fast Fingerprint Classification with Deep Neural Networks', in Proceedings of the 12th International Conference on Computer Vision, Imaging and Computer Graphics Theory and Applications (VISiGRAPP 2017), Science and Technology Publications (SCITEPRESS), Lda, 2017, ISBN: pp. 202-209.
Taylor, L., Nitschke, G., (Aug. 20, 2017), 'Improving Deep Learning using Generic Data Augmentation', in arXiv preprint arXiv:1708.06020v1 [cs.LG]2017.
Antoniou, A., Storkey, A., Edwards, H., (Mar. 21, 2018), 'Data Augmentation Generative Adversarial Networks', in arXiv preprint arXiv:1711.04340v3 [stat.ML], 2018.

* cited by examiner

PARAMETER TRAINING METHOD FOR A CONVOLUTIONAL NEURAL NETWORK

CROSS-REFERENCE TO RELATED APPLICATIONS

This application claims the benefit of French Patent Application No. 1855170 filed Jun. 13, 2018, the disclosure of which is herein incorporated by reference in its entirety.

GENERAL TECHNICAL FIELD

The present invention relates to the field of supervised training, and in particular a parameter training method for a convolutional neural network in order to classify input data by means of the learned convolutional neural network.

STATE OF THE ART

Neural networks are massively used for data classification.

After an automatic training phase (generally supervised, meaning on an already classified reference database), a neural network "learns" and becomes capable on its own of applying the same classification to unknown data.

Convolutional neural networks (CNN) are a type of neural network in which the connection pattern between neurons is inspired by the visual cortex of animals. They are thus particularly suited to a specific type of classification, image analysis; with them, efficient, recognition of people or objects in images or videos, in particular in security applications (e.g. automatic surveillance, threat detection, etc.), is in fact possible.

Quite specifically, the use of CNN is known in the field of biometric authentication/identification. In fact, a CNN can be trained to recognize an individual on the basis of biometric traits of this individual such as fingerprints (finger recognition), iris or face (facial recognition). Insofar as these data are manipulated in image form, the CNN proves very effective.

Conventional biometric approaches use characteristic information of the biometric trait extracted from the acquired biometry, called features, and the training/classification is done on the basis of the comparison of these characteristics.

For example, in the case of fingerprint recognition, fingertip images are processed so as to extract the characteristics of the print which can be classified into three categories:
  Level 1 comprises the general pattern of this print (one of four classes: right loop, left loop, arch and whorl);
  Level 2 comprises specific points of the prints called minutia. The conventional recognition approaches essentially use these characteristics.
  Level 3 comprises the shape of the peaks, pores of the skin, etc.

With recent approaches in the field of deep training, major advances have been possible especially in the field of facial recognition. With these approaches, biometry can be represented by a reduced factor without it being necessary any longer to explicitly extract the characteristics. In other words, the training/classification can be done directly on the basis of facial photographs.

The application of such approaches to the recognition of fingerprints runs up against specifics inherent in fingerprints and until now the performance has not been persuasive. In particular, the CNN requires a larger volume of training data.

Techniques called augmentation are known which aim to artificially increase the volume of input data in order to avoid overtraining and to allow the generalization of the fingerprint model, meaning that the "original examples" of training data are randomly modified in order to show a larger variability at the input to the neural network during training.

The known data augmentation techniques consist of applying random modifications.

Generally, the data augmentation done in the field of image recognition is limited to modifications of intensity (e.g. contrast, luminosity, etc.) or simple geometric modifications (e.g. rotation, translation, perspective) as proposed for example in the document Krizhevsky, A., Sutskever, I., & Hinton, G. E. (2012). *Imagenet classification with deep convolutional neural networks. In Advances in neural information processing systems* (pp. 1097-1105).

However, digital fingerprints have specific variabilities since one print is generally a 3D projection of the finger either by contact on the sensor or by a photograph of the finger. This implies the addition of a nonlinear distortion and specific modification of intensity for the digital fingerprint. The document R. Cappelli, D. Maio, D. Maltoni, "*Synthetic Fingerprint-Database Generation,*" *Proc. 16th Conf. Pattern Recognition*, pp. 744-747, 2002-Aug. doi: 10.1109/ICPR.2002.1048096 proposes for example the use of physical models defined a priori for synthesizing prints. These models are very specific to contact sensors and are proving fairly limited.

Generating alternate versions of training data by application of at least one geometric transformation chosen among a set of reference transformations satisfying a statistical distribution of transformations observed in the training database is proposed in the document Soren Hauberg et al., "*Dreaming More Data: Class-dependent Distributions over Diffeomorphisms for Learned Data Augmentation*". While such a technique turns out to be interesting for adding variability, in particular for handwritten character recognition (that is the example proposed) in which there were only small deformations related to hand movements, it is observed that it again proves poorly suited to digital fingerprints in which it is not rare to have very large local and global distortions (e.g., related to a crushing of the finger or configuration of the sensor), which are completely ignored by this method.

It is therefore observed that there is no training data augmentation technique for a CNN which proves satisfactory.

Consequently it would be desirable to have a more effective training solution based on image type data representative of a biometric trait, in particular fingerprints, for parameters of a CNN for data classification by means of the CNN.

BRIEF DESCRIPTION OF THE INVENTION

According to a first aspect, the present invention relates to a parameter training method for a convolutional neural network, CNN, for classifying image type data representative of a biometric trait, where the method is characterized in that it comprises the implementation, by data processing means of a server, of steps of:
  (a) For at least one data item from an already classified training database, generation of several alternate versions of this data each by application of at least one transformation chosen from a set of reference transformations satisfying a statistical distribution of transformations observed in the training database.
  (b) Training the parameters of said CNN, from the already classified training database augmented with said alternate versions of the data.

According to other advantageous and nonlimiting characteristics:

Said biometric traits are chosen from fingerprints, palms, faces, irises, silhouettes, blood networks of a body part, and in particular fingerprints;

Said transformations are geometric transformations and/or intensity transformations;

Step (a) comprises substeps of:
  (a1) Statistical modeling of the transformations observed in said training database;
  (a2) Determination of said set of reference transformations satisfying a statistical distribution of transformations observed in the training database based on the result of said statistical modeling;

Said transformations observed in the training database are nonlinear transformations with which to map from one member of a training data pair to the other where the pair is representative of a single biometric trait, where step (a1) comprises the determination of the observed transformations;

Said transformations are geometric transformations, where the modeling step (a1) comprises the construction of a statistical atlas of the training data containing an average of the geometric transformations observed in the training database and also the variability of these geometric transformations observed in the training database;

Said geometric transformations observed in the training database are determined in the form of a nondiffeomorphic distortion field, made diffeomorphic by application of a regularization technique;

Said determination of the geometric transformations observed in the training database comprises prior recasting of the training database into a shared reference frame;

The construction of said statistical atlas further comprises the implementation of statistical tools in the space tangent to said diffeomorphic distortion field;

Said statistical tools comprise at least principal component analysis;

The reference geometric transformations are determined in step (a2), as the geometric transformations defined by the eigenvectors resulting from the principal component analysis;

The step (a) further comprises the application of an intensity transformation chosen from a set of predetermined reference intensity transformations for generating alternate versions of the training data.

According to a second aspect, the present invention relates to a classification method for input data, characterized in that it comprises the implementation of the training method for a CNN according to the first aspect, and then a step of:
  (c) Classification of a client from said input data by data processing means using the CNN.

According to a third and fourth aspect, the invention proposes a computer program product comprising code instructions for the execution of a method according to the first or second aspect of parameter training for a convolutional neural network, CNN, or classification of an input data item; and a storage means readable by computer equipment in which a computer program product comprises code instructions for execution of a method according to the first or second parameter training aspect of the convolutional neural network, CNN, or from classification of an input data item.

DESCRIPTION OF THE FIGURES

Other characteristics and advantages of the present invention will appear upon reading the following description of a preferred embodiment. This description will be given with reference to the attached drawings in which.

DETAILED DESCRIPTION

Architecture

The present method proposes a parameter training method for a convolutional neural network (CNN) for data classification. A CNN that has learned using this method could be used according to the prior art for classification of input data, in other words the present training method does not require a specific classification method, i.e. the resulting CNN can be used directly. As will be seen, the classification performance is substantially improved.

Figure 1:
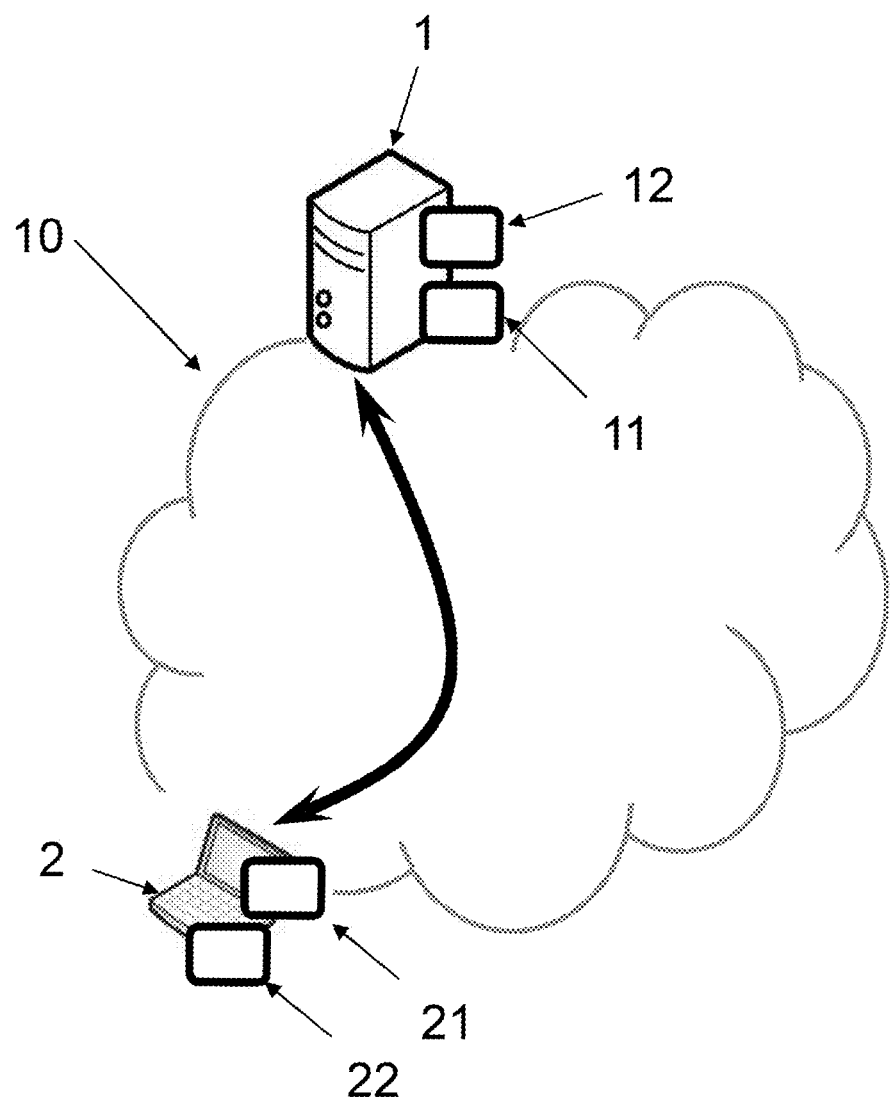
FIG. 1 is a diagram of an architecture for implementation of the methods according to the invention.

The present method is implemented within an architecture such as shown by FIG. 1, with a server 1 and a client 2. The server 1 is the training device (implementing the training method) and the client 2 is a classification device (implementing the classification method), for example a user terminal. It is entirely possible that the two devices 1, 2 are the same.

In any case, each device 1, 2 is typically remote computer equipment connected to an extended network 10 for exchange of data such as the Internet. Each comprises data processing means 11, 21 of processor type and data storage means 12, 22 such as computer memory, for example a drive.

The server 1 stores a training database, i.e. a set of already classified data (in contrast to the data described as input, which is in fact to be classified).

In fact, the input or training data are image type, and are representative of a biometric trait (in other words it involves images of a biometric trait), advantageously chosen from a fingerprint, a palm, a face, an iris, a silhouette, a blood network of a body part; of the user, and preferably a fingerprint (as will be seen, the present method is specifically effective in this last case). Said classification is then respectively of finger recognition of the user (e.g. authentication or identification of the individual by recognition of their fingerprint). Conventionally, such a training database comprises several representative data of a single biometric trait, i.e. representing the same identity, for example several occurrences of the same fingerprint.

CNN

A CNN generally comprises four types of layers successively processing information:
  The convolution layer which processes blocks from the input one after the other;
  The nonlinear layer with which to add nonlinearity to the network and therefore to have much more complex decision functions;

The pooling layer with which to combine several neurons into a single neuron;

The fully connected layer which connects all the neurons from one layer to all the neurons of the preceding layer.

The nonlinear layer activation function NL is typically the function ReLU (Rectified Linear Unit) which is equal to f(x)=max(0, x) and the pooling layer (labeled POOL) the most used as the function MaxPool2×2 which corresponds to a maximum among four values of a square (four values are pooled into only one).

The convolution layer, labeled CONV, and the fully connected layer, labeled FC, generally correspond to a scalar product between the neurons of the preceding layer and the weight from the CNN.

Typical CNN architectures stack several pairs of CONV→NL layers and then add a POOL layer and repeat this plan [(CONV→NL)$^p$→POOL] until getting a sufficiently small size output factor, and then ending by two fully connected FC layers.

This is a typical CNN architecture:
INPUT→[[CONV→NL]$^p$→POOL]$^n$→FC→FC

Augmentation

Figure 2:
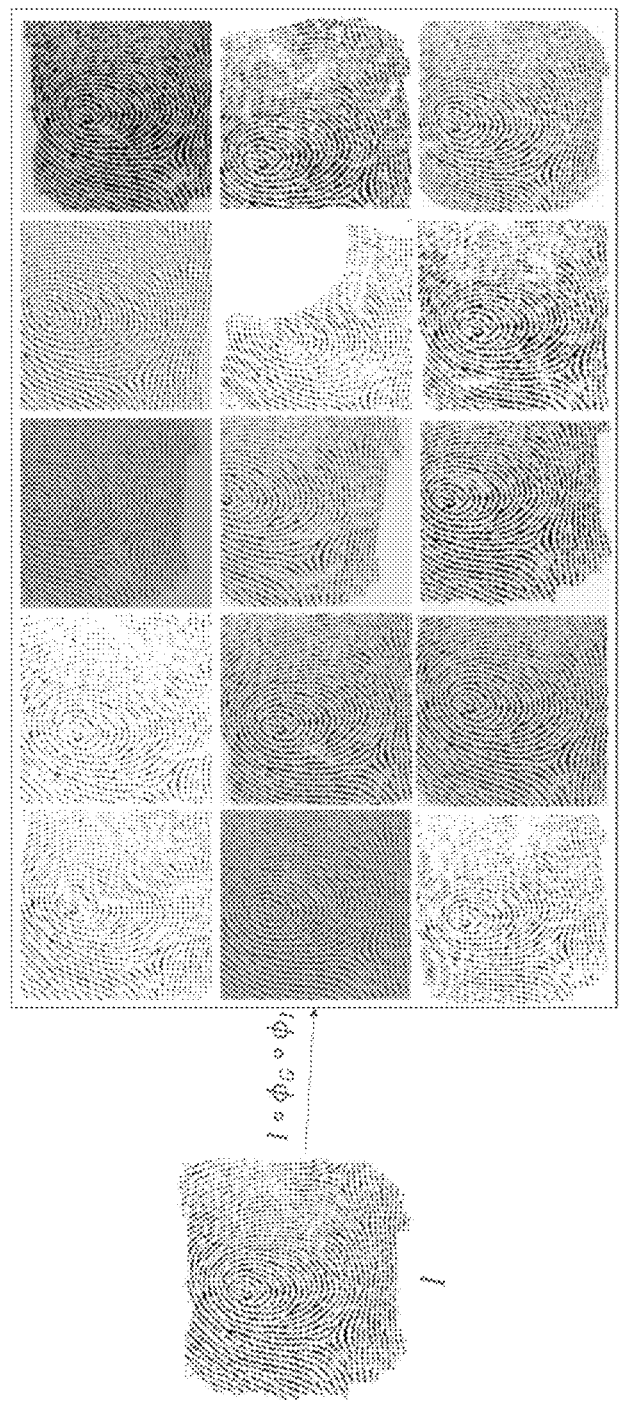
FIG. 2 shows examples of alternate versions of training data obtained during implementation of the training method according to the invention.
Figure 3:
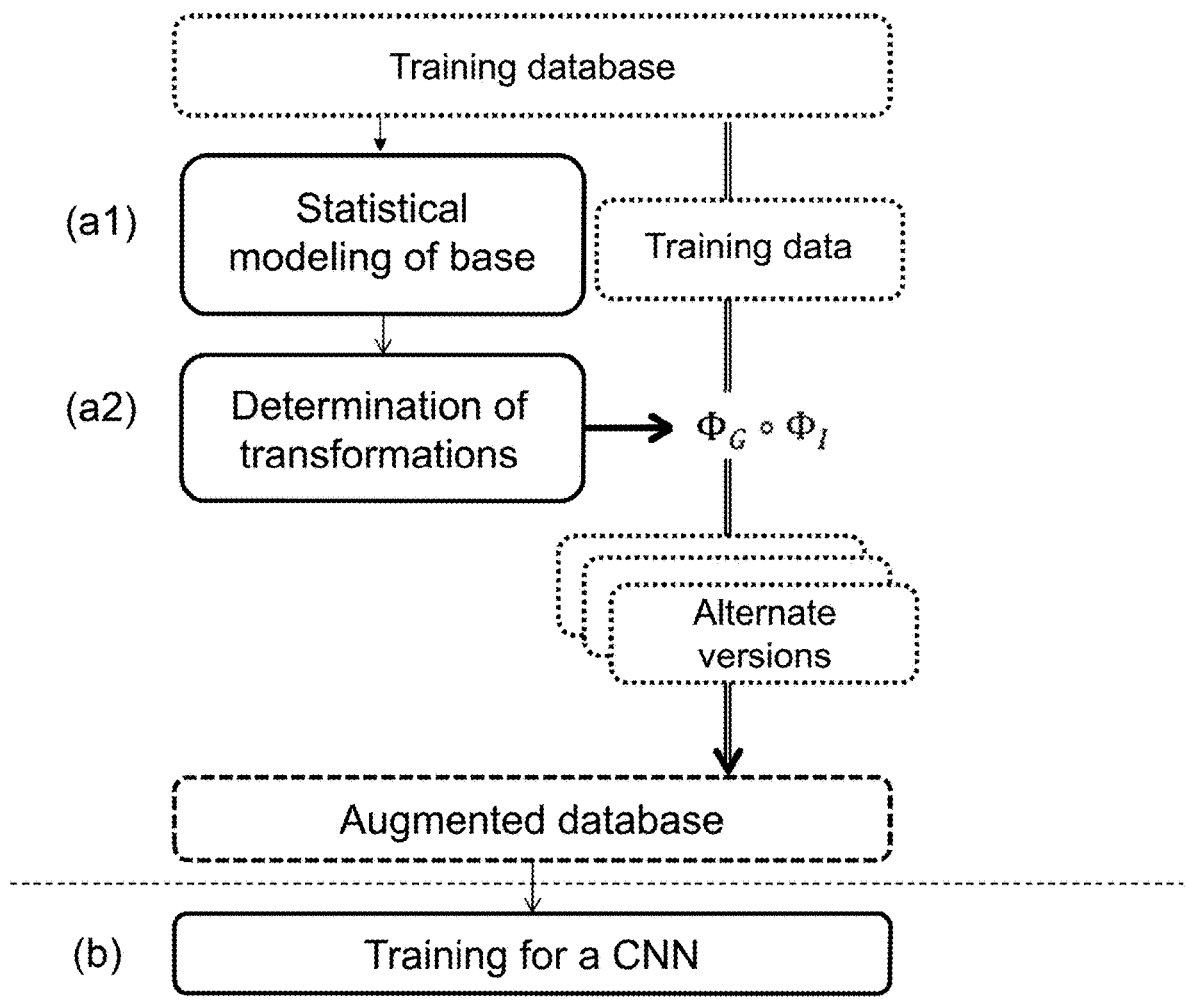
FIG. 3 schematically shows the steps of the training process according to the invention.

With reference to FIG. 2, the training method is implemented by the data processing means 11 of the server 1.

The present method is distinguished in that it comprises a specific "augmentation" of the training data. At least one training data item (advantageously a plurality, even all data) is augmented, meaning that several alternate versions of this training data item are generated in one step (a) each by the application of at least one transformation chosen from a set of reference transformations. More precisely, a "family" of reference transformations (generally differing by parameter values) is available and a plurality are chosen randomly for application to the "original" data so as to obtain alternate versions. Preferably said transformations are geometric transformations (labeled $\Phi_G$) and or intensity transformations (labeled $\Phi_I$)

In other words, and as will be seen later, the generation of an alternate version of the training data thus comprises preferably the application of at least one geometric transformation chosen from a set of reference geometric transformations, and advantageously the application of at least one intensity transformation chosen from a set of reference intensity transformations. In all cases, the choice from the reference transformation set can be random, alternately all the reference transformations can be applied once so as to generate as many alternate versions of the original example of the training data considered as there are transformations.

In the preferred embodiment comprising both a geometric transformation and an intensity transformation, by noting training data/, the optical transformation and the intensity transformation are applied successively, meaning that each alternate version of training data of this has the form $I \circ \Phi_G \circ \Phi_I$. By crossing the geometric and intensity transformations, a large number of realistic and varied alternate versions are quickly obtained for training data, as can for example be seen on FIG. 1, which shows an example in the case of fingerprint type data. It will be understood that it is entirely possible to do the inverse and start by the intensity transformation ($I \circ \Phi_I \circ \Phi_G$), or even accumulate several.

Transformation is understood to mean any function generating a modified image from an original image. Geometric transformation is understood to mean a transformation relating to the position of the image points, in other words, a deformation. It is understood that it is a one-to-one mapping of the image onto itself, meaning not changing "the intensity" of the points moved, i.e. the associated values. The geometric transformations $\Phi_G$ are thus advantageously represented by one-to-one nonlinear distortion fields.

Intensity transformations are understood to mean other transformations, i.e. not moving points but modifying the associated values, corresponding for example to changes in contrast, luminosity or simulating alterations of the biometric trait. For example, for fingerprints, partial occultations, relief variations ("embossing"), appearance of scars, erosion/dilation of ridges, etc. can be considered. The variability of sensors with or without contact can be modeled with embossing transformations. Contactless sensors in fact introduce shadowy effects created by the relief of the print. The erosions/dilations are simple morphological operations of erosion and dilation with which to model the variability in width of the ridges affected by moisture or dryness of the finger and the force with which the finger is pressed against a contact sensor. The person skilled in the art will know how to make such intensity transformations $\Phi_I$.

Principle of the Invention

The originality is considering a set of reference transformations satisfying the statistical distribution of observed transformations in the training database by means of the specific statistical modeling, based on what is called a statistical atlas. In other words, the set of transformations is considered whose parameters come from a statistical modeling of a "real" base (i.e. with a "natural" distribution of associated modifications) which is the training base so as to proceed with realistic augmentations which do not disturb the training of the model.

In fact, this way random changes within the observed natural variability are allowed: it is understood that by randomly performing transformations satisfying the distribution of transformations observed in the training database, the resulting "new modifications" do not change this distribution. Transformations specific to the subject of the training base respecting the predominance of the modifications relative to each other then result, and the augmented training base thus (i.e. with the generated alternate versions) forms a coherent whole. Otherwise, the CNN learns structural noise and is biased by unrealistic alternate versions of training data.

It should be noted that it must be understood that said observed transformations, whose statistical distribution is being determined, are those among training data representative of the same biometric trait. In other words, it can be considered that once there are two training data items corresponding to the same trait, i.e. the same biometry acquired twice, then it can be considered that one is the modification of the other and that there exists a transformation with which to map from one to the other.

In the present method, the principle of respecting the statistical distribution of transformations observed in the training database can be applied to geometric transformations $\Phi_G$ and advantageously to intensity transformations $\Phi_I$. In the preferred example which will be described in the remainder of the description, this principle will be applied solely to geometric transformations $\Phi_G$ (i.e. the step (a) comprises the application of at least one geometric transformation chosen among a set of reference geometric transformations relating to a statistical distribution of geometric transformations—i.e. distortions—observed in the training database), and the intensity transformations $\Phi_I$ for their part will be chosen as satisfying a statistical distribution whether observed or not in a training database, but generally over several types of data acquisition means considered (for example for fingerprints, capacitive, optical or remote sensor). Thus the reference set of intensity transformations can be predetermined (see later).

The person skilled in the art will however understand that the invention is not limited to this embodiment and that the reference set of intensity transformations $\Phi_I$ satisfying the statistical distribution of observed intensity transformations observed in the training database can be constructed.

For example, statistical analyses can be done on the parameters to be considered, for example the width of the ridges. Each parameter is considered as a random variable and the transformations $\Phi_I$ are done randomly in series on the original copy.

Thus, the step (a) advantageously comprises the prior substeps (a1) of statistical modeling of transformations (distortions if geometric transformations are considered) observed in said training database, and (a2) generation of said set of reference transformations satisfying the statistical distribution of transformations observed in the training database depending on the results of said statistical modeling.

As brought up, this modeling from step (a1) is done in the form of a statistical atlas of the training data. A statistical atlas of distortions contains an average of the distortions and also the variability of these distortions over a training data population. In other words, the construction of the statistical atlas contains an "average model" corresponding for each class (i.e. the set of training data representative of the same trait) to an average image (in particular in the meaning of recasting, see later) and also to the variability of geometric transformations towards this average model observed in the training database.

To get this average model, the person skilled in the art can for example adapt the method described in the document F. Girard, C. Kavalec, F. Cheriet, "Statistical atlas-based descriptor for an early detection of optic disc abnormalities," J. Med. Imag. 5(1) 014006 (6 Mar. 2018), by using the mathematical bases described in the document M. Turk and A. Pentland, "Eigenfaces for recognition," Journal of Cognitive Neuroscience 1991 3:1, 71-86, specifically choosing for each class a reference image among the images of a class, and then changing this reference print by calculating the average of the diffeomorphisms (for example with the log-demons as explained in the document F. Girard, C. Kavalec, F. Cheriet, "Statistical atlas-based descriptor for an early detection of optic disc abnormalities," J. Med. Imag. 5(1) 014006 (6 Mar. 2018)) with each iteration.

Preferably, the step (a1) next comprises the determination of "relative" transformations defining said average of the distortions, which are nonlinear distortions with which to map from one data item from a class of representative training data of a single biometric trait to the average image of this class. Said statistical modeling of the transformations observed in said training database is thus preferably done on the basis of these relative transformations, i.e. the statistical model is obtained by systematically applying these relative transformations, which are completely representative of the real observed transformations and which therefore allow reproducing the statistical distribution of geometric transformations observed in the training database.

With this procedure, very strong realistic deformations towards this average can be analyzed, unlike the technique presented in the document Soren Hauberg et al., "Dreaming More Data: Class-dependent Distributions over Diffeomorphisms for Learned Data Augmentation" which without an atlas is limited to doing statistics on small clusters (K=5) of nearby characteristics, hence a geometric increase based on very small deformations which therefore completely omit larger deformations.

It should be noted that performing statistical analyses on the distortion fields is not natural, since the base operation over the space of the distortion fields is composition and not addition.

The trick is to consider the space tangent to the distortion field which is exactly equivalent to the velocity field if the transformation is diffeomorphic. In the tangent space, the usual vector space operations (e.g. addition, scalar products) exist and it is possible to use statistical tools like Principal Component Analysis (PCA).

More precisely, in order to build said statistical atlas of distortions, in a first step preferably a common reference frame is formed in which the training data are recast by an affine transformation, in particular depending on the position of key elements (for example cores and deltas in the case of fingerprints, in particular by using the method described in the document L. Fan, S. Wang, H. Wang and T. Guo, "Singular Points Detection Based on Zero-Pole Model in Fingerprint Images," in IEEE Transactions on Pattern Analysis and Machine Intelligence, vol. 30, no. 6, pp. 929-940, June 2008.). Note that in the absence of recasting, that would imply that the statistical atlas of distortions includes translations and rotations, which is not desired.

In this common reference frame, each nonlinear geometric transformation observed between a training data pair representative of the same trait can be expressed in the form of a diffeomorphic distortion field (i.e. one-to-one and without folds). Thus, geometric transformations are determined with which to map from one member to the other of a training data pair representative of a single biometric trait (and to do so preferably for all possible pairs so as to obtain all transformations).

To do that, a (first) distortion field (non diffeomorphic) can be defined, represented for example by a "Thin Plate Spline" (TPS) by applying for example the method described in the document A. Ross, S. C. Dass, A. K. Jain (2004) Estimating Fingerprint Deformation. In: Zhang D., Jain A. K. (eds) Biometric Authentication. Lecture Notes in Computer Science, vol 3072. Springer, Berlin, Heidelberg, and making it diffeomorphic (i.e. a second distortion field is obtained that is diffeomorphic this time) and by a regularization technique consisting of eliminating possible folds for each point of the distortion field. Thus, the TPS of each image towards the reference image thereof can be calculated for determining said relative transformations.

Then, as explained, statistical analyses can finally be done in the space tangent to the space of diffeomorphisms by using in particular the mathematical bases described in the document V. Arsigny, O. Commowick, X. Pennec, N. Ayache. (2006) A Log-Euclidean Framework for Statistics on Diffeomorphisms. In: Larsen R., Nielsen M., Sporring J. (eds) Medical Image Computing and Computer-Assisted Intervention—MICCAI 2006. MICCAI 2006. Lecture Notes in Computer Science, vol 4190. Springer, Berlin, Heidelberg.

By applying for example a PCA, the modes of variability in distortion field form can be identified, as in the method described in the document F. Girard, C. Kavalec, F. Cheriet, "Statistical atlas-based descriptor for an early detection of optic disc abnormalities," J. Med. Imag. 5(1) 014006 (6 Mar. 2018).

The geometric part of the data augmentation then consists in particular of applying a fraction of the eigenvectors resulting from the principal component analysis. In other words said geometric transformations of said set are determined in step (a2) like the geometric transformations defined by the eigenvectors resulting from the principal component analysis.

As explained, if the step (a) comprises the application of at least one geometric transformation chosen from a set of reference geometric transformations satisfying a statistical distribution of geometric transformations observed in the training database, it advantageously further comprises the application of at least one intensity transformation chosen from a set of reference intensity transformations, this time predetermined (not a function of the training database), where the transformations are composed for generating the alternate versions.

In this embodiment, the intensity transformations, can for their part be obtained by statistically modeling the intensity dynamics (average and deviation) over several types of data acquisition means considered (for example for fingerprints, capacitive, optical or remote sensor), several types of acquisitions (for example for fingerprints, latent, fingertip, whole finger acquisitions) and several "contexts" (related to the environment, for example the "quality" of prints: scars, dry finger, etc.). These dynamics give distributions over contrast and luminosity parameters, and/or contextual parameters specific to the type of biometric trait considered.

Training and Classification

At the end of step (a), there is an "augmented" training database of said alternate versions of the data, meaning that it now comprises, in addition to the original copies of the training data, alternate versions thereof. In other words, the size of the training database has been demultiplied: in the example from FIG. 2, 15 alternate versions were generated for one training data item.

The training data are already classified and each alternate version of the training data item can be classified identically to the original copy thereof (because they represent the same biometric trait).

In a step (b), using said augmented training database, the first server learns the parameters for the CNN conventionally.

The learned CNN can be stored as necessary on the data storage means 12 of the client 2 for use in classification.

It will be understood that the alternate versions are not necessarily stored in the training database when they are generated: it is possible to generate them on the fly, or even concurrently with step (b). More specifically, in this latter case the possible steps (a1) and (a2) are first implemented for determining said reference set of transformations, and then the remainder of the step (a) (application of the transformations for generating alternate versions) is implemented at the moment of step (b). Thus the alternate versions are "single use," meaning that the original training base is augmented randomly and infinitely without calling for further storage.

According to a second aspect, the invention relates to a classification method for an input data item (in particular an image of a biometric trait for which the associated identity is to be determined) comprising the implementation of the training method for a CNN according to the first aspect (steps (a) and (b)), then implementation of a step (c) of classification of said input data by means of the CNN by data processing means 21 of client 2.

This step (c) is implemented as explained conventionally; it is just understood that the CNN learned on a larger and more realistic training database and consequently has improved operating performance.

Computer Program Product

According to a third and fourth aspect, the invention relates to a computer program product comprising code instructions for execution (in particular on data processing means 11, 21 of the server 1 or client 2) of a method according to the first aspect of the parameter training invention for a CNN or a method according to the second aspect of the invention for classification of an input data item, and also storage means readable by computer equipment (memory 12, 22 of the server 1 or the terminal 2) on which this computer program product is located.

The invention claimed is:

1. A parameter training method for a convolutional neural network (CNN) for classifying image type data representative of a biometric trait, comprising an implementation, by data processing means of a server, the steps of:
  a) For at least one data item from a training database which stores already classified training data, generating several alternate versions of the at least one data item each by application of at least one geometric transformation chosen from a set of reference transformations satisfying a statistical distribution of geometric transformations observed in the training database, comprising a construction of a statistical atlas of the training database which includes an average model of images from the training database and a variability of geometric transformations observed in the training database;
  b) Training the parameters of said CNN, from the training database augmented with said alternate versions of the at least one data item:
  wherein step a) comprises substeps of:
    a1) Statistical modeling of the transformations observed in said training database by means of said statistical atlas;
    a2) Determination of said set of reference transformations satisfying a statistical distribution of transformations observed in the training database depending on the result of said statistical modeling;
  wherein said transformations observed in the training database are nonlinear transformations with which to map from one member of a training data pair to the other where the pair is representative of a single biometric trait, wherein step a1) comprises the determination of the observed transformations; and
  wherein said average model of images comprises, for each set of already classified training data representative of a single biometric trait, an average image associated with said set the step a1) further comprising the determination of nonlinear relative transformations with which to map an already classified training data to the average image associated with the set to which said already classified training data belongs; the statistical modeling of the transformations observed in said training database being done on the basis of said nonlinear relative transformations.

2. The method according to claim 1, wherein said biometric traits is at least one of a fingerprint, a palm, a face, an iris, a silhouette, a blood network of a body part.

3. The method according to claim 1, wherein the step (a1) comprises the determination of the associated average image from transformations observed within the set for each said set of already classified training data representative of a single biometric trait.

4. The method according to claim 1, wherein said geometric transformations observed in the training database are determined in the form of a nondiffeomorphic distortion field, made diffeomorphic by application of a regularization technique.

5. The method according to claim 4, wherein said determination of the geometric transformations observed in the training database comprises prior recasting of the training database into a shared reference frame.

6. The method according to claim 4, wherein the construction of said statistical atlas further comprises an implementation of statistical tools in the space tangent to said diffeomorphic distortion field.

7. The method according to claim 6, wherein said statistical tools comprise at least a principal component analysis.

8. The method according to claim 7, wherein the reference geometric transformations are determined in step (a2) as geometric transformations defined by the eigenvectors coming from the principal component analysis.

9. The method according to claim 1, wherein the step (a) further comprises the application of an intensity transformation chosen from a set of predetermined reference intensity transformations for generating alternate versions of the already classified training data.

10. A classification method for input data, comprising the implementation of the training method for a CNN according to claim 1, and then a step of:

c) Classification of a client from said input data by a data processing means of the client or by the data processing means of the server using the CNN.

11. A non-transitory computer program product comprising code instructions for the execution of a method according to claim 10 for classification of an input data item, when said program is executed by a computer.

12. A non-transitory storage means readable by computer equipment comprising code instructions for the execution of a method according to claim 10 for classification of an input data item.

13. A non-transitory computer program product comprising code instructions for the execution of a method according to claim 1 for parameter training for a convolutional neural network, when said program is executed by a computer.

14. A non-transitory storage means readable by computer equipment in which a computer program product comprising code instructions for the execution of a method according to claim 1 for parameter training for a convolutional neural network.

* * * * *